United States Patent
Ji et al.

(10) Patent No.: US 11,838,294 B2
(45) Date of Patent: Dec. 5, 2023

(54) METHOD FOR IDENTIFYING USER, STORAGE MEDIUM, AND ELECTRONIC DEVICE

(71) Applicant: BEIJING BAIDU NETCOM SCIENCE AND TECHNOLOGY CO., LTD., Beijing (CN)

(72) Inventors: Kunpeng Ji, Beijing (CN); Shuangquan Yang, Beijing (CN); Xueting Zhang, Beijing (CN)

(73) Assignee: Beijing Baidu Netcom Science and Technology Co., LTD., Beijing (CN)

( * ) Notice: Subject to any disclaimer, the term of this patent is extended or adjusted under 35 U.S.C. 154(b) by 322 days.

(21) Appl. No.: 17/369,680

(22) Filed: Jul. 7, 2021

(65) Prior Publication Data
US 2021/0336964 A1    Oct. 28, 2021

(30) Foreign Application Priority Data
Jul. 17, 2020  (CN) .......................... 202010693947.0

(51) Int. Cl.
*H04L 9/40*     (2022.01)
*H04L 67/306*   (2022.01)
(Continued)

(52) U.S. Cl.
CPC .......... *H04L 63/105* (2013.01); *H04L 63/102* (2013.01); *H04L 67/306* (2013.01)

(58) Field of Classification Search
CPC ... H04L 63/105; H04L 63/102; H04L 67/306; H04L 63/104; G06F 16/2465;
(Continued)

(56) References Cited

U.S. PATENT DOCUMENTS 8,180,674 B2 * 5/2012 Madhavan ........... H04N 21/812
                                                  705/14.49
8,769,127 B2 * 7/2014 Selimis ................ H04L 67/75
                                                  709/227
(Continued)

FOREIGN PATENT DOCUMENTS

JP    2005070889 A    3/2005
JP    2009223688 A    10/2009
(Continued)

OTHER PUBLICATIONS

Office Action for Japanese Application No. 2021-082021, dated Jun. 28, 2022, 3 pages.
(Continued)

*Primary Examiner* — Darren B Schwartz
(74) *Attorney, Agent, or Firm* — Lippes Mathias LLP (57) ABSTRACT

A method for identifying a user includes: controlling an electronic device to connect to a first communication network; obtaining target behavior data of a user to be identified from a data pool corresponding to the first communication network, in which, the data pool stores at least one type of candidate behavior data of a candidate user, the candidate behavior data is obtained from a data source corresponding to a second communication network, and a security level of the first communication network is higher than a security level of the second communication network; and obtaining a category of the user to be identified by analyzing the target behavior data based on the first communication network.

17 Claims, 6 Drawing Sheets

(51) Int. Cl.
*G06F 16/2458* (2019.01)
*G06F 16/26* (2019.01)
*G06F 21/31* (2013.01)
*G06F 21/62* (2013.01)
*G06Q 30/02* (2023.01)
*G06Q 50/26* (2012.01)
*G06F 16/242* (2019.01)

(58) Field of Classification Search
CPC .... G06F 16/26; G06F 21/316; G06F 21/6236; G06F 21/6272; G06F 21/6218; G06F 16/2433; G06Q 30/02; G06Q 50/26
See application file for complete search history.

(56) References Cited

U.S. PATENT DOCUMENTS

| | | | |
|---|---|---|---|
| 8,978,114 B1* | 3/2015 | Kaushik | G06N 3/08 726/4 |
| 9,219,720 B1* | 12/2015 | Satpathy | G06F 21/46 |
| 9,917,849 B2* | 3/2018 | Bitton | H04L 63/0227 |
| 10,129,269 B1* | 11/2018 | Ford | H04L 67/535 |
| 10,664,851 B1* | 5/2020 | Barnes | H04M 15/44 |
| 10,812,478 B1* | 10/2020 | Davis | H04L 63/08 |
| 11,516,220 B1* | 11/2022 | Singh | H04L 63/104 |
| 11,601,434 B1* | 3/2023 | Hornsby | H04L 63/0428 |
| 2004/0243835 A1* | 12/2004 | Terzis | H04L 63/0263 726/3 |
| 2006/0026682 A1* | 2/2006 | Zakas | H04L 9/40 726/22 |
| 2006/0248083 A1* | 11/2006 | Sack | G06F 21/6218 707/999.009 |
| 2006/0248599 A1* | 11/2006 | Sack | H04L 63/102 707/999.009 |
| 2008/0052288 A1* | 2/2008 | Flinn | G06F 16/335 |
| 2008/0072035 A1* | 3/2008 | Johnson | H04L 65/611 713/153 |
| 2009/0234667 A1* | 9/2009 | Thayne | H04L 63/102 707/999.102 |
| 2009/0300009 A1* | 12/2009 | Rezaei | H04L 67/535 707/999.005 |
| 2011/0022477 A1* | 1/2011 | Hatridge | G06Q 30/02 715/745 |
| 2011/0061089 A1* | 3/2011 | O'Sullivan | H04L 63/102 726/1 |
| 2011/0209194 A1* | 8/2011 | Kennedy | H04L 63/101 726/1 |
| 2011/0213789 A1* | 9/2011 | Doshi | G06F 21/6218 707/754 |
| 2011/0282964 A1* | 11/2011 | Krishnaswamy | G06Q 30/02 709/217 |
| 2012/0102543 A1* | 4/2012 | Kohli | H04L 63/20 726/1 |
| 2013/0081099 A1* | 3/2013 | Sathish | G06F 21/6245 726/1 |
| 2013/0238422 A1* | 9/2013 | Saldanha | G06Q 30/02 705/14.45 |
| 2014/0230076 A1* | 8/2014 | Micucci | H04L 63/08 726/28 |
| 2014/0282936 A1* | 9/2014 | Fitzgerald | H04L 41/0806 709/221 |
| 2016/0379268 A1* | 12/2016 | Song | G06N 20/00 705/14.53 |
| 2017/0230335 A1* | 8/2017 | Walker | H04L 63/107 |
| 2018/0060363 A1* | 3/2018 | Ko | G06F 16/21 |
| 2018/0248889 A1* | 8/2018 | Deninno | H04L 63/105 |
| 2018/0375886 A1 | 12/2018 | Kirti et al. | |
| 2019/0095600 A1* | 3/2019 | Chan | G06F 21/316 |
| 2019/0387002 A1 | 12/2019 | Ford et al. | |
| 2020/0021620 A1 | 1/2020 | Puratheppparambil et al. | |
| 2020/0236184 A1* | 7/2020 | Tian | H04L 67/306 |
| 2020/0358777 A1* | 11/2020 | Threlkeld | H04L 9/0643 |
| 2021/0136113 A1* | 5/2021 | Barhudarian | H04L 63/20 |
| 2021/0297846 A1* | 9/2021 | Obaidi | H04L 41/12 |
| 2021/0312392 A1* | 10/2021 | Zhou | H04L 63/20 |
| 2022/0414087 A1* | 12/2022 | McGregor | G06Q 30/0201 |

FOREIGN PATENT DOCUMENTS

| | | |
|---|---|---|
| JP | 2017182445 A | 10/2017 |
| JP | 2018018317 A | 2/2018 |
| JP | 2019022171 A | 2/2019 |

OTHER PUBLICATIONS

Extended European Search Report for Application No. 21185097.9, dated Dec. 17, 2021, 10 pages.

* cited by examiner

METHOD FOR IDENTIFYING USER, STORAGE MEDIUM, AND ELECTRONIC DEVICE

CROSS-REFERENCE TO RELATED APPLICATION

The present application claims priority to Chinese Application No. 202010693947.0, filed Jul. 17, 2020, the disclosure of which is herein incorporated by reference.

TECHNICAL FIELD

The disclosure relates to the field of big data technologies, specifically to the field of cloud computing technologies, smart city technologies, artificial intelligence technologies, and deep learning technologies, and particularly to a method for identifying a user, a storage medium, and an electronic device.

BACKGROUND

Various user behavior data related to people's livelihood, security, and the like may be scattered in the public security field of smart cities, such as in a public security system. However, these user behavior data may be often scattered in internal networks of various administrative systems, so that they may not play the due role in the construction of smart cities.

SUMMARY

According to a first aspect, a method for identifying a user is provided. The method may include: controlling an electronic device to connect to a first communication network; obtaining target behavior data of a user to be identified from a data pool corresponding to the first communication network, in which, the data pool stores at least one type of candidate behavior data of a candidate user, the candidate behavior data is obtained from a data source corresponding to a second communication network, and a security level of the first communication network is higher than a security level of the second communication network; and obtaining a category of the user to be identified by analyzing the target behavior data based on the first communication network.

According to a second aspect, an electronic device is provided. The electronic device may include: at least one processor; and a memory communicatively coupled to the at least one processor; in which, the memory is configured to store instructions executable by the at least one processor, and when the instructions are executed by the at least one processor, the at least one processor is caused to perform the method as described above.

According to a third aspect, a non-transitory computer-readable storage medium storing computer instructions is provided, in which the computer instructions are configured to enable a computer to perform the method as described above.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The accompanying drawings are used to understand the solution better, and do not constitute a limitation on the application, in which.

DETAILED DESCRIPTION

The following describes the exemplary embodiments of the disclosure with reference to the accompanying drawings, which includes various details of the embodiments of the disclosure to facilitate understanding and shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Figure 1:
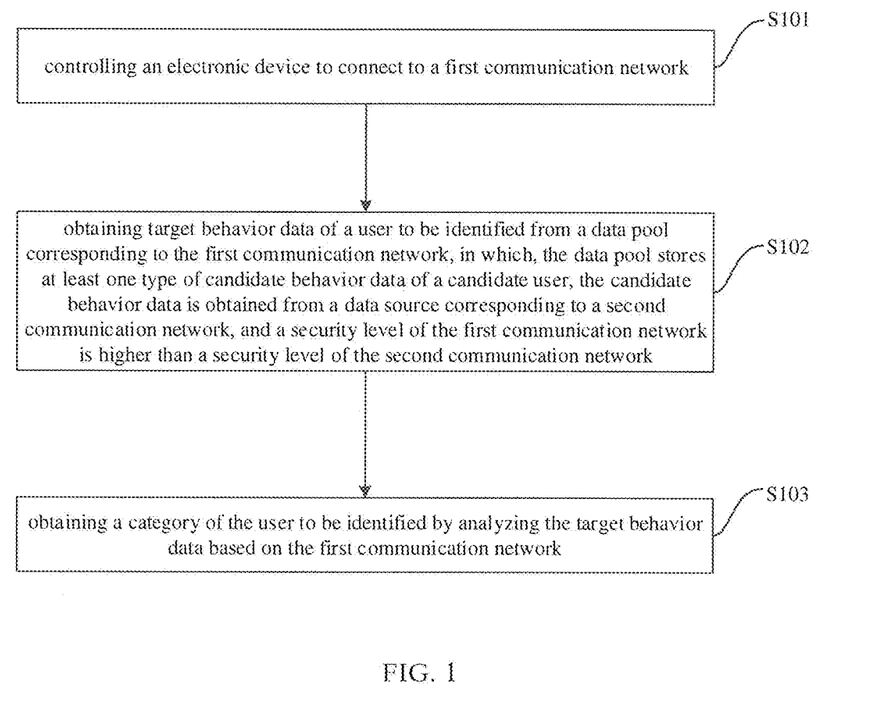
FIG. 1 is a schematic diagram illustrating a first embodiment of the disclosure.

FIG. 1 is a schematic diagram illustrating a first embodiment of the disclosure. It should be noted that an execution subject of a method for identifying a user provided in some embodiments may be an apparatus for identifying a user provided in some embodiments. The apparatus may be implemented by software and/or hardware. The apparatus may be configured in an electronic device. The electronic device may include but be not limited to a terminal and a server.

The disclosure relates to the field of cloud computing technologies, smart city technologies, artificial intelligence technologies, and deep learning technologies. The cloud computing is one type of distributed computing, which may refer to the huge data calculating and processing programs being decomposed into countless small programs through the network "cloud" and the small programs being processed and analyzed through a system including multiple servers to obtain results and return to a user. The smart city may refer to opening up and integrating systems and services of a city through various information technologies or innovative concepts to improve the resource utilization efficiency, optimize city management and services, and improve the quality of life of citizens. Artificial Intelligence, abbreviated as AI, is a new technical science that studies and develops theories, methods, technologies, and application systems for simulating, extending, and expanding human intelligence. The deep learning (DL) learns inherent law and representation hierarchy of sample data, and information obtained in the learning process is of great help in interpretation of data such as words, images and sound. The final goal of DL is that the machine may have analytic learning ability like human beings, which may recognize data such as words, images, sound.

As illustrated in FIG. 1, the method may include the following.

At S101, an electronic device is controlled to connect to a first communication network.

The electronic device may be a cellular phone, a cordless phone, a session initiation protocol (SIP) phone, a wireless local loop (WLL) station, a personal digital assistant (PDA), a handheld device with a wireless communication function, a computing device, other processing device connected to a wireless modem, an in-vehicle device, a wearable device, and an electronic device in the future 5G network.

When performing actions of the method for identifying the user, some embodiments of the disclosure may combine the first communication network and the second communication network to identify the category of the user to be identified. A security level of the first communication network is higher than a security level of the second communication network.

That is, some embodiments of the disclosure may combine two different security levels of communication networks to identify the category of the user to be identified, where the security level refers to a confidentiality level corresponding to the communication network.

The communication network is, for example, a local area network.

For example, when a communication network has a first confidentiality level, it is assumed that the communication network may be accessed by administrator users, and when a communication network has a second confidentiality level, it is assumed that the communication network may be accessed by administrator users and users of external networks. It may indicate that the first confidentiality level is higher than the second confidentiality level, and further indicate that the security level of the communication network with the first confidentiality level is higher than the security level of the communication network with the second confidentiality level.

The "first" in the above-mentioned first communication network is identified with respect to the "second" in the above-mentioned second communication network. The security level of the first communication network is higher than the security level of the second communication network. "First" and "second" are not regarded as special restrictions or limitations.

In some embodiments of the disclosure, a communication network with a higher security level may be referred to as the first communication network, and a communication network with a lower security level than the first communication network may be referred to as the second communication network.

In other words, when the method of identifying the user is performed, the electronic device may be controlled to connect to the first communication network. In the initial situation, the electronic device may be in a state of not being connected to the communication network, thereby directly controlling the electronic device to connect to the first communication network. Or, in the initial situation, the electronic device is connected to the second communication network, and the electronic device may be controlled to switch from being connected to the second communication network to being connected to the first communication network, which is not limited herein.

At S102, target behavior data of a user to be identified is obtained from a data pool corresponding to the first communication network, in which, the data pool stores at least one type of candidate behavior data of a candidate user, the candidate behavior data is obtained from a data source corresponding to a second communication network, and a security level of the first communication network is higher than a security level of the second communication network.

The data pool may be understood as a database or a data storage space. The data pool corresponding to the first communication network may be understood as a data pool in which data may be accessed based on the first communication network.

In the data pool corresponding to the first communication network, the target behavior data of the user to be identified may be obtained, which may include the following. A user identifier of the user to be identified may parsed, and corresponding candidate behavior data may be obtained based on the user identifier from the data pool as the target behavior data. Alternatively, a user matching manner may be employed to match a candidate user matching the user to be identified from the data pool, and candidate behavior data of the candidate user may be used as the target behavior data, which is not limited herein.

In some embodiments of the disclosure, the behavior data in the data pool may be obtained and stored in advance.

When the at least one type of candidate behavior data of the candidate user is obtained in advance, it may be obtained in advance from a data source corresponding to the second communication network, where the security level of the second communication network is lower than the security level of the first communication network. The data source may correspond to an administrative unit. For example, the data source may be a data source of the Public Security Bureau, a data source of the Civil Affairs Bureau, a data source of the Health Bureau, etc., which is not limited herein.

The aforementioned type of candidate behavior data may be candidate behavior data corresponding to the data source, for example, a type of candidate behavior data corresponding to the data source of the Public Security Bureau, a type of candidate behavior data corresponding to the data source of the Civil Affairs Bureau, and a type of candidate behavior data corresponding to the data source of the Health Bureau, etc.

That is, some embodiments of the disclosure may support the integration and aggregation of the second communication network at a lower security level to the first communication network at a higher security level. After the aggregation and integration, the candidate behavior data of the candidate user of each data source is stored in the data pool corresponding to the first communication network, and it assists in analyzing the target behavior data based on the first communication network when identifying the category of the user to obtain the category of the user to be identified.

At S103, a category of the user to be identified is obtained by analyzing the target behavior data based on the first communication network.

After the electronic device is controlled to be connected to the first communication network and the target behavior data of the user to be identified is obtained from the data pool corresponding to the first communication network, the target behavior data may be analyzed based on the first communication network to obtain the category of the user to be identified. The analysis of the behavior data of the user in the first communication network with a higher security level may be realized, so as to obtain a better identification effect and data security.

When analyzing the target behavior data based on the first communication network, any data analysis manner in the field of artificial intelligence technologies and deep learning technologies may be used to analyze the target behavior data to obtain the category of the user to be identified. For example, data characteristics of the target behavior data may be analyzed, and the data characteristics may be matched with some pre-configured characteristics, so that the category corresponding to the matched characteristics may be used as the identified category, which is not limited herein.

Therefore, when the method of identifying the user is applied in the field of cloud computing technologies, artificial intelligence technologies, and deep learning technologies, tens of thousands of data may be processed in a short duration (a few seconds). The powerful network services may be effectively realized, improving effectively the identification accuracy and efficiency.

In some embodiments, the electronic device may be controlled to be connected to the first communication network and the target behavior data of the user to be identified may be obtained from the data pool corresponding to the first communication network, in which, the data pool stores at least one type of candidate behavior data of the candidate user, the candidate behavior data is obtained from the data source corresponding to the second communication network, and the security level of the first communication network is higher than the security level of the second communication network. The category of the user to be identified may be obtained by analyzing the target behavior data based on the first communication network. The user behavior data corresponding to the data source of the second communication network may be integrated into the data pool in the first communication network, so as to improve the data utilization efficiency in the second communication network. The category of the user to be identified may be identified based on the integrated data in the first communication network, thereby obtaining a better identification effect and data security.

Figure 2:
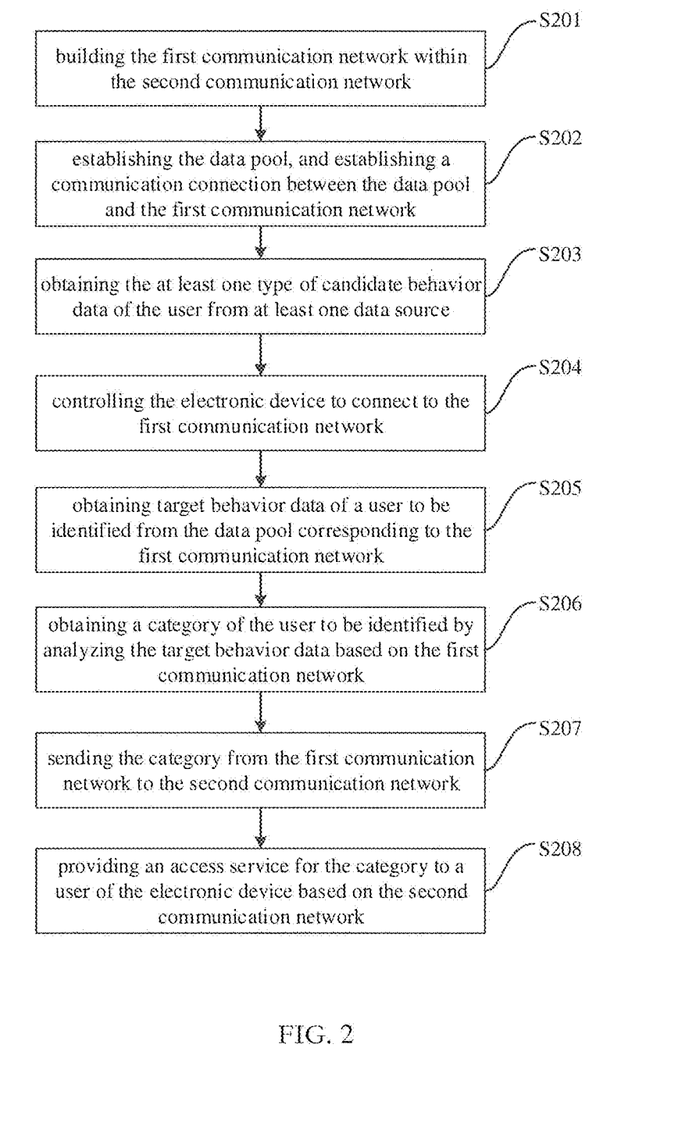
FIG. 2 is a schematic diagram illustrating a second embodiment of the disclosure.

FIG. 2 is a schematic diagram illustrating a second embodiment of the disclosure.

As illustrated in FIG. 2, the method may include the following.

S201, the first communication network is built within the second communication network.

For example, when a communication network has a first confidentiality level, it is assumed that the communication network may be accessed by administrator users, and when a communication network has a second confidentiality level, it is assumed that the communication network may be accessed by administrator users and users of external networks. It may indicate that the first confidentiality level is higher than the second confidentiality level, and further indicate that the security level of the communication network with the first confidentiality level is higher than the security level of the communication network with the second confidentiality level.

In some embodiments of the disclosure, a communication network with a higher security level may be referred to as the first communication network, and a communication network with a lower security level than the first communication network may be referred to as the second communication network.

In some embodiments of the disclosure, the above-mentioned first communication network and second communication network may both be local area networks, and each local area network has a different security level.

When the first communication network is built within the second communication network, a dual-layer network nesting design architecture may be realized, while saving the hardware modification cost of the apparatus for identifying the user and avoiding excessive hardware/software resources.

Thus, when the first communication network is built within the second communication network, the electronic device is controlled to be connected to the first communication network, which may be specifically as follow. In the initial situation, the electronic device is connected to the second communication network, and the electronic device is controlled to switch from being connected to the second communication network to being connected to the first communication network, which is not limited herein.

At S202, the data pool is established and a communication connection between the data pool and the first communication network is established.

After the first communication network is built within the second communication network, the data pool may be established, and the communication connection between the data pool and the first communication network may be established. That is, a data storage space is established within the first communication at a higher security level, and the data storage space is used to import and store user behavior data provided by various data sources, and assist in the integration and real-time calculation of various user behavior data, which is not limited herein.

At S203, the at least one type of candidate behavior data of the user is obtained from at least one data source, and the candidate behavior data is stored in the data pool.

The at least one type of behavior data of the user may be obtained from the at least one data source, which may be referred to as the candidate behavior data.

When the at least one type of candidate behavior data of the candidate user is obtained in advance, it may be obtained in advance from a data source corresponding to the second communication network, where the security level of the second communication network is lower than the security level of the first communication network. The data source may correspond to an administrative unit. For example, the data source may be a data source of the Public Security Bureau, a data source of the Civil Affairs Bureau, a data source of the Health Bureau, etc., which is not limited herein.

The aforementioned type of candidate behavior data may be candidate behavior data corresponding to the data source, for example, a type of candidate behavior data corresponding to the data source of the Public Security Bureau, a type of candidate behavior data corresponding to the data source of the Civil Affairs Bureau, and a type of candidate behavior data corresponding to the data source of the Health Bureau, etc.

In other words, all kinds of data that are originally dispersed in the second communication network, such as the Civil Affairs Bureau, the Health Bureau, and the Public Security Bureau, may be import into the data pool of the first communication network to establish the data pool of the first communication network (the data pool may be called Data Market). A combination of a unique user identifier and a source identifier may be used to identify various candidate behavior data in the data pool. In addition, sources, fields, meanings, etc. of various data may also be identified, and a unified access interface may be provided based on the data pool for subsequent calls when identifying users.

In some embodiments, the first communication network is built within the second communication network, the data pool is established, the communication connection between the data pool and the first communication network is established, and the at least one type of candidate behavior data of the user is obtained from the at least one data source and stored in the data pool, which effectively solves technical problems of various data that are scattered in internal systems of respective administrative units in the related art, and integrates data from various data sources in the field of smart cities, and effectively improves the data utilization efficiency, thereby effectively ensuring the identification accuracy of subsequent identifying users, and improving the identification effect.

S204, the electronic device is controlled to connect to the first communication network.

S205, target behavior data of a user to be identified is obtained from the data pool corresponding to the first communication network.

S206, a category of the user to be identified is obtained by analyzing the target behavior data based on the first communication network.

The detailed description of S204-S206 may be referred to the above-mentioned embodiments, which is not be repeated herein.

S207, the category is sent from the first communication network to the second communication network.

In some embodiments, the category is sent from the first communication network to the second communication network in a multi-layer network forwarding manner.

Of course, any other possible manner may be used to send the category from the first communication network to the second communication network, which is not limited herein.

S208, an access service for the category is provided to a user of the electronic device based on the second communication network.

For example, when the identified category of the user to be identified exists in the first communication network, the multi-layer network forwarding manner may be employed to send the category from the first communication network to the second communication network. For example, a related application programming interface for accessing this category may be provided, such that the user of the electronic device may achieve a hierarchical design of data processing and data services when accessing within the second communication network, thereby effectively preventing the identified category of the user from directly contacting, further ensuring the security of data, which is more conducive to use the method for identifying the user in the construction of smart cities.

For example, the identified category of the user to be identified may also be stored in the data pool of the first communication network. When the user of the electronic device is granted the permission to access the first communication network, it may pass through the first communication network to access the data in the data pool. When the user of the electronic device is not granted the permission to access the first communication network but is granted the permission to access the second communication network, after the category is sent from the first communication network to the second communication network, the user may access the identified category via the second communication network, thereby realizing the isolation of data processing and data services, and ensuring data security.

In some embodiments, the user behavior data corresponding to the data source of the second communication network is integrated into the data pool in the first communication network, so as to improve the data utilization efficiency in the second communication network. The category of the user may be identified based on the integrated data in the first communication network, so as to obtain a better identification effect and data security. The first communication network is built within the second communication network, the data pool is established, the communication connection between the data pool and the first communication network is established, and the at least one type of candidate behavior data of the user is obtained from the at least one data source and stored in the data pool. When the first communication network is built within the second communication network, the dual-layer network nesting design architecture may be realized, while saving the hardware modification cost of the apparatus for identifying the user and avoiding excessive hardware/software resources. Also, it effectively solves technical problems of various data that are scattered in internal systems of respective administrative units in the related art, and integrates data from various data sources in the field of smart cities, and effectively improves the data utilization efficiency, thereby effectively ensuring the identification accuracy of subsequent identifying users, and improving the identification effect.

Figure 3:
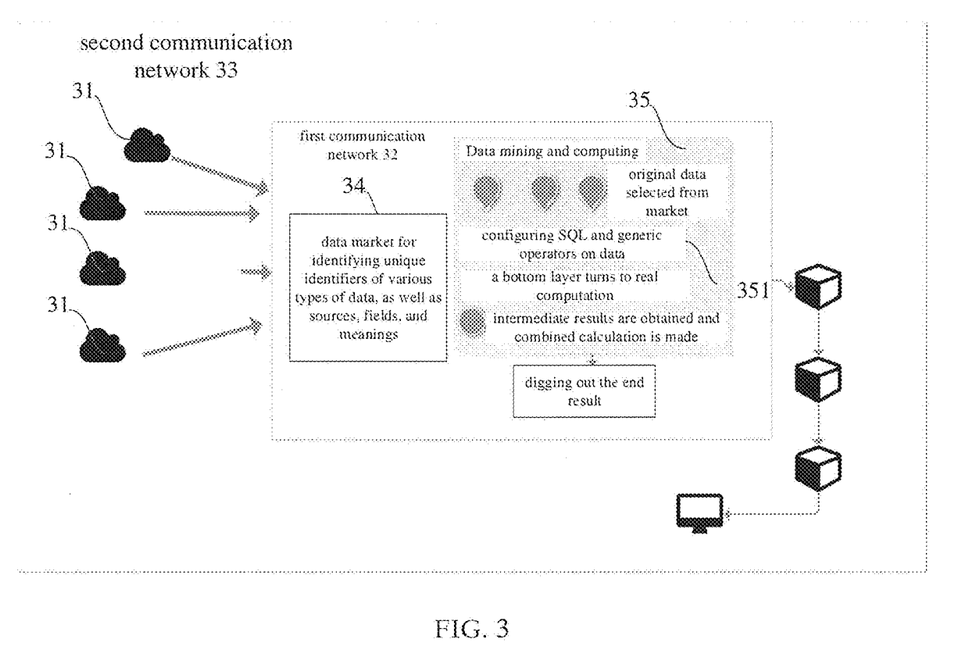
FIG. 3 is a schematic diagram illustrating a scene for implementing some embodiments of the disclosure.

Referring to FIG. 3, FIG. 3 is a schematic diagram illustrating a scene for implementing some embodiments of the disclosure. The scene includes a plurality of data sources 31, a first communication network 32, a second communication network 33, a data market 34, and a user operation interface 35. A function editing interface 351 may also be provided on the user operation interface 35. Based on the scene in FIG. 3, the disclosure further provides a method for identifying a user, which may be refer to FIG. 4.

Figure 4:
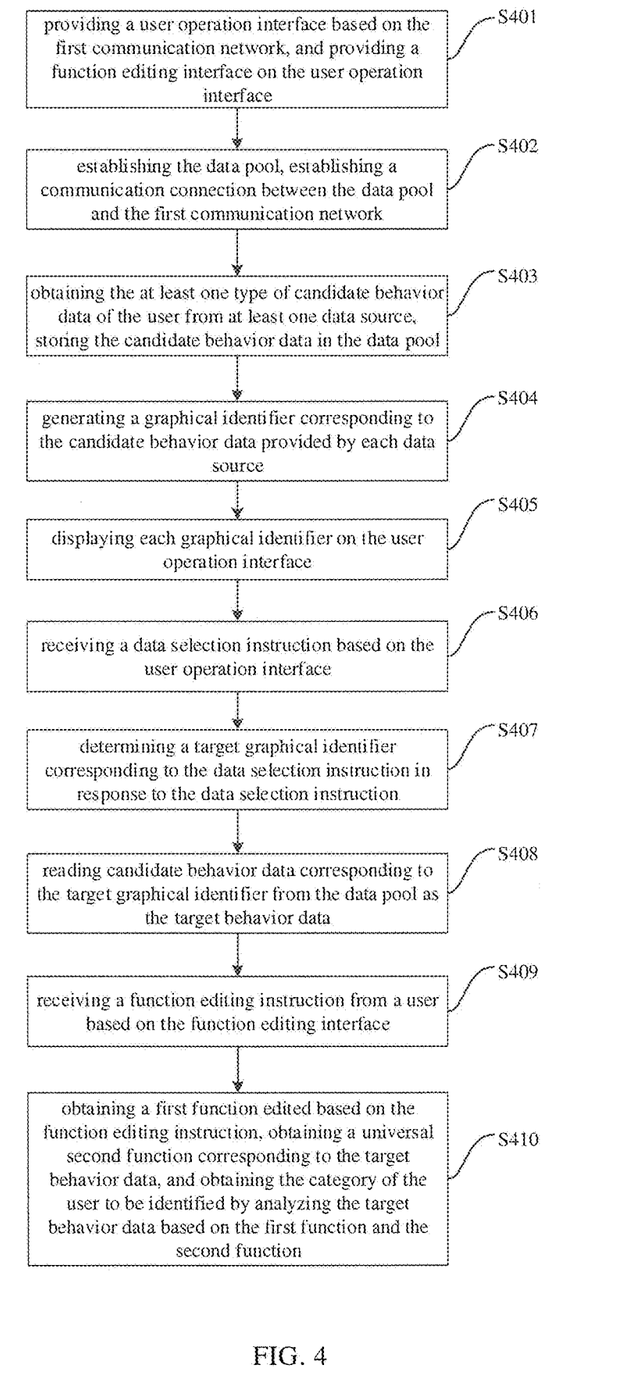
FIG. 4 is a schematic diagram illustrating a third embodiment of the disclosure.

FIG. 4 is a schematic diagram illustrating a third embodiment of the disclosure.

As illustrated in FIG. 4, the method may include the following.

S401, a user operation interface is provided based on the first communication network, and a function editing interface is provided on the user operation interface.

The user operation interface may respond to an operation instruction of a user with an access permission to the first communication network and provide a function corresponding to the operation instruction.

For example, a function of selecting target behavior data may be provided, a function of inputting a structured query language (SQL) may be provided to add, delete, modify, and check the candidate behavior data in the data pool, or other functions may be provided.

For example, a function of editing a function may be provided to the user based on the function editing interface, so that the user with the access permission to the first communication network may edit the first function through the function editing interface, and the first function may be employed to identify the category of the user.

S402, the data pool is established and a communication connection between the data pool and the first communication network is established.

S403, the at least one type of candidate behavior data of the user is obtained from at least one data source, and the candidate behavior data is stored in the data pool The detailed description of S402-S403 may be referred to the above-mentioned embodiments, which is not be repeated herein.

S404, a graphical identifier corresponding to the candidate behavior data provided by each data source is generated.

For example, the candidate behavior data may correspond to a type of data source, such as a type of candidate behavior data corresponding to a data source of the Public Security Bureau, and a type of candidate behavior data corresponding to a data source of the Civil Affairs Bureau, and a type of candidate behavior data corresponding to a data source of the Health Bureau, and the like. Therefore, the graphical identifier of the type of candidate behavior data corresponding to the data source of the Public Security Bureau may be for example a logo that carries security words or picture. The graphical identifier of the type of candidate behavior data corresponding to the data source of the Civil Affairs Bureau may be for example a logo that carries Civil Affairs words or picture. The graphical identifier of the type of candidate behavior data corresponding to the data source of the Health Bureau may be for example a logo that carries health and environmental protection words or picture, which is not limited herein.

S405, each graphical identifier is displayed on the user operation interface.

S406, a data selection instruction is received based on the user operation interface.

S407, a target graphical identifier corresponding to the data selection instruction is determined in response to the data selection instruction.

After receiving the data selection instruction based on the user operation interface, the candidate behavior data corresponding to the target graphical identifier may be directly pulled from the data pool in response to the data selection instruction, and the target graphical identifier may be presented on the user operation interface. Also, the target graphical identifier may be marked with a marker to indicate that the target graphical identifier has been selected.

S408, candidate behavior data corresponding to the target graphical identifier is read from the data pool as the target behavior data.

The user operation interface may be provided based on the first communication network, and various graphical identifiers may be displayed on the user operation interface. Therefore, the display effect of the integrated data sources may be improved, and the user may locate the target behavior data in the massive data. The data selection instruction may be received based on the user operation interface, and the candidate behavior data corresponding to the target graphical identifier is read from the data pool as the target behavior data. Therefore, the operation convenience may be improved, the efficiency of obtaining the target behavior data may be improved, the on-demand obtaining may be realized, the visual interaction effect based on the first communication network may be improved, and the user experience may be improved.

S409, a function editing instruction from a user is received based on the function editing interface.

S410, a first function edited based on the function editing instruction is obtained, a universal second function corresponding to the target behavior data is obtained, and the category of the user to be identified is obtained by analyzing the target behavior data based on the first function and the second function.

In some embodiments, the function editing interface may also be provided based on the first communication network. That is, some functions of editing functions may be provided to the user based on the function editing interface. The function edited by the user may be regarded as the first function. The first function may be used to mine association relationships between various target behavior data, or be used for other functions that perform corresponding function operations on the target behavior data, which is not limited herein.

When the function editing interface is provided based on the first communication network, in some embodiments, the function editing instruction from the user may be received based on the function editing interface, the first function edited may be obtained based on the function editing instruction may be obtained, the universal second function corresponding to the target behavior data, and the target behavior data may be analyzed based on the first function combined with the second function to obtain the category of the user to be identified, That is, the disclosure not only supports analyzing the target behavior data through the first function edited by the user, but also supports analyzing the target behavior data through the combination of the first function and the universal second function provided by the first communication network, thereby combining the first function and the second function to analyze the target behavior data. Therefore, the personalized analysis needs of the user may be satisfied, and a better analysis effect may be obtained with the supplement by the universal second function pre-configured in the electronic device, thereby improving the user identification effect.

For example, the user operation interface provided based on the first communication network may be regarded as a canvas. The user operation interface may support the user to create a new canvas. The graphical identifier corresponding to each candidate behavior data that has been stored in the data pool in the first communication network may be queried based on the data selection instruction in response to the data selection instruction. Therefore, the target graphical identifier corresponding to the data selection instruction is determined. The target graphical identifier may be dragged onto the newly created canvas. The function editing instruction from the user may be received on the function editing interface provided by the user operation interface, and the first function edited based on the function editing instruction may be obtained. The universal second function corresponding to the target behavior data may be obtained. The target behavior data may be analyzed by the combination of the first function and the second function to obtain the category of the user to be identified.

In some embodiments, the user behavior data corresponding to the data source of the second communication network may be integrated into the data pool in the first communication network, so as to improve the data utilization efficiency in the second communication network. The category of the user to be identified may be identified based on the integrated data in the first communication network, thereby obtaining a better identification effect and data security. The user operation interface may be provided based on the first communication network, and various graphical identifiers may be displayed on the user operation interface. Therefore, the display effect of the integrated data sources may be improved, and the user may locate the target behavior data in the massive data. The data selection instruction may be received based on the user operation interface, and the candidate behavior data corresponding to the target graphical identifier is read from the data pool as the target behavior data. Therefore, the operation convenience may be improved, the efficiency of obtaining the target behavior data may be improved, the on-demand obtaining may be realized, the visual interaction effect based on the first communication network may be improved, and the user experience may be improved. The disclosure not only supports analyzing the target behavior data through the first function edited by the user, but also supports analyzing the target behavior data through the combination of the first function and the universal second function provided by the first communication network, thereby combining the first function and the second function to analyze the target behavior data. Therefore, the personalized analysis needs of the user may be satisfied, and a better analysis effect may be obtained with the supplement by the universal second function pre-configured in the electronic device, thereby improving the user identification effect.

Figure 5:
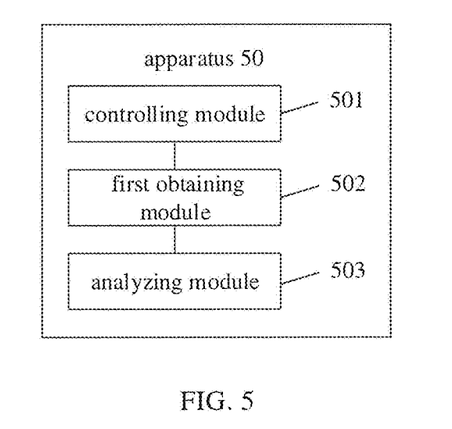
FIG. 5 is a schematic diagram illustrating a fourth embodiment of the disclosure.

FIG. 5 is a schematic diagram illustrating a fourth embodiment of the disclosure.

As illustrated in FIG. 5, the apparatus includes a controlling module 501, a first obtaining module 502, and an analyzing module 503.

The controlling module 501 is configured to control an electronic device to connect to a first communication network.

The first obtaining module 502 is configured to obtain target behavior data of a user to be identified from a data pool corresponding to the first communication network, in which, the data pool stores at least one type of candidate behavior data of a candidate user, the candidate behavior data is obtained from a data source corresponding to a second communication network, and a security level of the first communication network is higher than a security level of the second communication network.

The analyzing module 503 is configured to obtain a category of the user to be identified by analyzing the target behavior data based on the first communication network.

Figure 6:
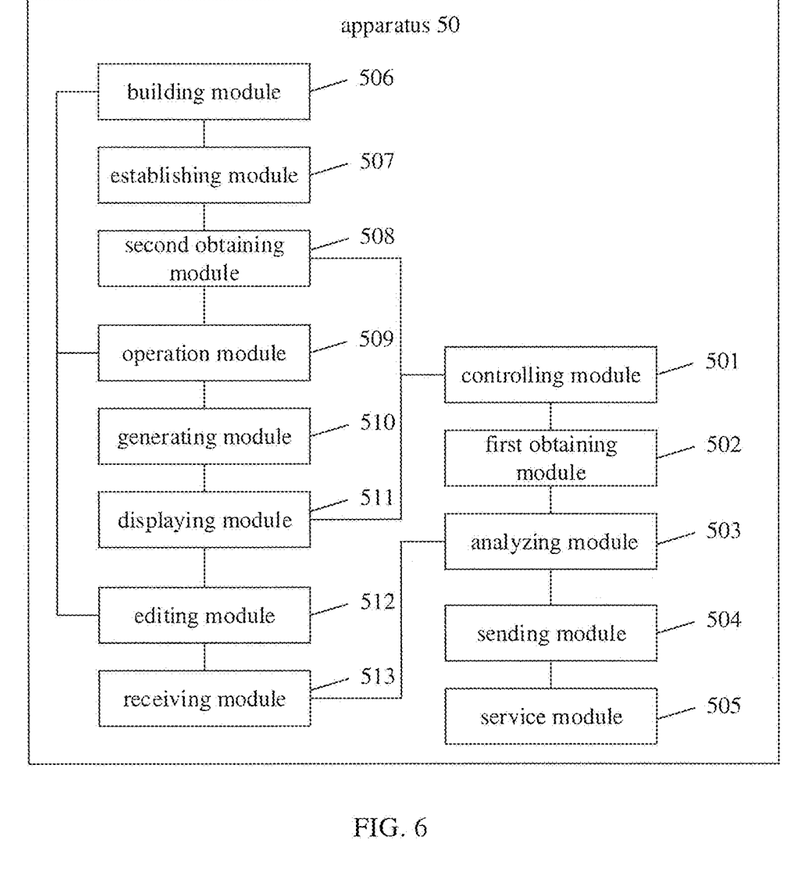
FIG. 6 is a schematic diagram illustrating a fifth embodiment of the disclosure.

In some embodiments, referring to FIG. 6, FIG. 6 is a schematic diagram illustrating a fifth embodiment of the disclosure. The apparatus further includes a sending module 504 and a service module 505.

The sending module 504 is configured to send the category from the first communication network to the second communication network.

The service module 505 is configured to provide an access service for the category to a user of the electronic device based on the second communication network.

In some embodiments, referring to FIG. 6, the apparatus further includes a building module 506, an establishing module 507, and a second obtaining module 508.

The building module 506 is configured to build the first communication network within the second communication network.

The establishing module 507 is configured to establish the data pool and a communication connection between the data pool and the first communication network.

The second obtaining module 508 is configured to obtain the at least one type of candidate behavior data of the user from at least one data source and store the candidate behavior data in the data pool.

In some embodiments, referring to FIG. 6, the apparatus further includes an operation module 509, a generating module 510, and a displaying module 511.

The operation module 509 is configured to provide a user operation interface based on the first communication network.

The generating module 510 is configured to generate a graphical identifier corresponding to the candidate behavior data provided by each data source.

The displaying module 511 is configured to display each graphical identifier on the user operation interface.

In some embodiments, the first obtaining module 502 is configured to: receive a data selection instruction based on the user operation interface; determine a target graphical identifier corresponding to the data selection instruction in response to the data selection instruction; and read candidate behavior data corresponding to the target graphical identifier from the data pool as the target behavior data.

In some embodiments, referring to FIG. 6, the apparatus further includes an editing module an editing module 512 and a receiving module 513.

The editing module 512 is configured to provide a function editing interface on the user operation interface.

The receiving module 513 is configured to receive a function editing instruction from a user based on the function editing interface.

The analyzing module 503 is configured to: obtain a first function edited based on the function editing instruction; obtain a universal second function corresponding to the target behavior data; and obtain the category of the user to be identified by analyzing the target behavior data based on the first function and the second function.

In some embodiments, the sending module 504 is configured to: send the category from the first communication network to the second communication network in a multi-layer network forwarding manner.

It should be noted that the foregoing explanation of the method for identifying the user is also applicable to the apparatus for identifying the user in these embodiment, which will not be repeated herein.

In some embodiments, the electronic device may be controlled to be connected to the first communication network and the target behavior data of the user to be identified may be obtained from the data pool corresponding to the first communication network, in which, the data pool stores at least one type of candidate behavior data of the candidate user, the candidate behavior data is obtained from the data source corresponding to the second communication network, and the security level of the first communication network is higher than the security level of the second communication network. The category of the user to be identified may be obtained by analyzing the target behavior data based on the first communication network. The user behavior data corresponding to the data source of the second communication network may be integrated into the data pool in the first communication network, so as to improve the data utilization efficiency in the second communication network. The category of the user to be identified may be identified based on the integrated data in the first communication network, thereby obtaining a better identification effect and data security.

An electronic device and a readable storage medium are further provided according to some embodiments of the disclosure.

Figure 7:
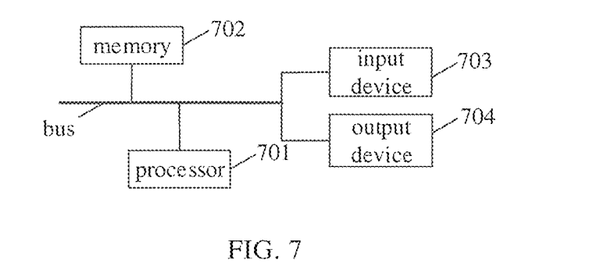
FIG. 7 is a block diagram illustrating an electronic device for implementing a method for identifying a user in some embodiments of the disclosure.

FIG. 7 is a block diagram illustrating an electronic device for implementing a method for identifying a user in some embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 7.

The memory 702 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 702 is configured to store non-transitory software programs, non-transitory computer executable programs and modules, such as program instructions/modules corresponding to the method in the embodiment of the disclosure. The processor 701 executes various functional applications and data processing of the server by running non-transitory software programs, instructions, and modules stored in the memory 702, that is, implementing the method in the foregoing method embodiments.

The memory 702 may include a storage program area and a storage data area, where the storage program area may store an operating system and application programs required for at least one function. The storage data area may store data created according to the use of the electronic device for implementing the method. In addition, the memory 702 may include a high-speed random access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

It should be understood that various forms of processes shown above may be used to reorder, add, or delete steps. For example, the steps described in the disclosure may be performed in parallel, sequentially, or in different orders. As long as the desired results of the technical solutions disclosed in the disclosure can be achieved, no limitation is made herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

The invention claimed is:

1. A method for identifying a user, comprising:
controlling an electronic device to connect to a first communication network;
obtaining target behavior data of a user to be identified from a data pool corresponding to the first communication network, in which, the data pool stores at least one type of candidate behavior data of a candidate user, the candidate behavior data is obtained from a data source corresponding to a second communication network, and a security level of the first communication network is higher than a security level of the second communication network;
obtaining a category of the user to be identified by analyzing the target behavior data based on the first communication network;
building the first communication network within the second communication network;
establishing the data pool;
establishing a communication connection between the data pool and the first communication network;
obtaining the at least one type of candidate behavior data of the user from at least one data source; and
storing the candidate behavior data in the data pool.

2. The method as claimed in claim 1, further comprising:
sending the category from the first communication network to the second communication network; and
providing an access service for the category to the user of the electronic device based on the second communication network.

3. The method as claimed in claim 2, wherein, sending the category from the first communication network to the second communication network, comprises:
sending the category from the first communication network to the second communication network in a multi-layer network forwarding manner.

4. The method as claimed in claim 1, further comprising:
providing a user operation interface based on the first communication network;
generating a graphical identifier corresponding to the candidate behavior data provided by each data source; and
displaying each graphical identifier on the user operation interface.

5. The method as claimed in claim 4, wherein, obtaining the target behavior data of the user to be identified from the data pool corresponding to the first communication network, comprises:
receiving a data selection instruction based on the user operation interface;
determining a target graphical identifier corresponding to the data selection instruction in response to the data selection instruction; and
reading candidate behavior data corresponding to the target graphical identifier from the data pool as the target behavior data.

6. The method as claimed in claim 4, further comprising:
providing a function editing interface on the user operation interface; and
receiving a function editing instruction from a user based on the function editing interface;
wherein, obtaining the category of the user to be identified by analyzing the target behavior data based on the first communication network, comprises:
obtaining a first function edited based on the function editing instruction;
obtaining a universal second function corresponding to the target behavior data; and
obtaining the category of the user to be identified by analyzing the target behavior data based on the first function and the universal second function.

7. An electronic device, comprising:
at least one processor; and
a non-transitory memory communicatively coupled to the at least one processor; wherein,
the memory is configured to store instructions executable by the at least one processor, and when the instructions are executed by the at least one processor, the at least one processor is caused to perform:
controlling an electronic device to connect to a first communication network;
obtaining target behavior data of a user to be identified from a data pool corresponding to the first communication network, in which, the data pool stores at least one type of candidate behavior data of a candidate user, the candidate behavior data is obtained from a data source corresponding to a second communication network, and a security level of the first communication network is higher than a security level of the second communication network;
obtaining a category of the user to be identified by analyzing the target behavior data based on the first communication network;
building the first communication network within the second communication network;
establishing the data pool;
establishing a communication connection between the data pool and the first communication network;
obtaining the at least one type of candidate behavior data of the user from at least one data source; and
storing the candidate behavior data in the data pool.

8. The device as claimed in claim 7, wherein when the instructions are executed by the at least one processor, the at least one processor is caused to further perform:
sending the category from the first communication network to the second communication network; and
providing an access service for the category to a user of the electronic device based on the second communication network.

9. The device as claimed in claim 8, wherein, sending the category from the first communication network to the second communication network, comprises:
sending the category from the first communication network to the second communication network in a multi-layer network forwarding manner.

10. The device as claimed in claim 7, wherein when the instructions are executed by the at least one processor, the at least one processor is caused to further perform:
providing a user operation interface based on the first communication network;
generating a graphical identifier corresponding to the candidate behavior data provided by each data source; and
displaying each graphical identifier on the user operation interface.

11. The device as claimed in claim 10, wherein, obtaining the target behavior data of the user to be identified from the data pool corresponding to the first communication network, comprises:
receiving a data selection instruction based on the user operation interface;

determining a target graphical identifier corresponding to the data selection instruction in response to the data selection instruction; and reading candidate behavior data corresponding to the target graphical identifier from the data pool as the target behavior data.

12. The device as claimed in claim 10, wherein when the instructions are executed by the at least one processor, the at least one processor is caused to further perform:

providing a function editing interface on the user operation interface; and receiving a function editing instruction from a user based on the function editing interface;

wherein, obtaining the category of the user to be identified by analyzing the target behavior data based on the first communication network, comprises:

obtaining a first function edited based on the function editing instruction;

obtaining a universal second function corresponding to the target behavior data; and obtaining the category of the user to be identified by analyzing the target behavior data based on the first function and the second function.

13. A non-transitory computer-readable storage medium storing computer instructions, wherein the computer instructions are configured to enable a computer to perform a method for identifying a user, the method comprising:

controlling an electronic device to connect to a first communication network;

obtaining target behavior data of a user to be identified from a data pool corresponding to the first communication network, in which, the data pool stores at least one type of candidate behavior data of a candidate user, the candidate behavior data is obtained from a data source corresponding to a second communication network, and a security level of the first communication network is higher than a security level of the second communication network;

obtaining a category of the user to be identified by analyzing the target behavior data based on the first communication network;

building the first communication network within the second communication network;

establishing the data pool;

establishing a communication connection between the data pool and the first communication network;

obtaining the at least one type of candidate behavior data of the user from at least one data source; and storing the candidate behavior data in the data pool.

14. The non-transitory computer-readable storage medium as claimed in claim 13, wherein the method further comprises:

sending the category from the first communication network to the second communication network; and providing an access service for the category to a user of the electronic device based on the second communication network.

15. The non-transitory computer-readable storage medium as claimed in claim 13, wherein the method further comprises:

providing a user operation interface based on the first communication network;

generating a graphical identifier corresponding to the candidate behavior data provided by each data source; and displaying each graphical identifier on the user operation interface.

16. The non-transitory computer-readable storage medium as claimed in claim 15, wherein, obtaining the target behavior data of the user to be identified from the data pool corresponding to the first communication network, comprises:

receiving a data selection instruction based on the user operation interface;

determining a target graphical identifier corresponding to the data selection instruction in response to the data selection instruction; and reading candidate behavior data corresponding to the target graphical identifier from the data pool as the target behavior data.

17. The non-transitory computer-readable storage medium as claimed in claim 15, wherein, the method further comprises:

providing a function editing interface on the user operation interface; and receiving a function editing instruction from a user based on the function editing interface;

wherein, obtaining the category of the user to be identified by analyzing the target behavior data based on the first communication network, comprises:

obtaining a first function edited based on the function editing instruction;

obtaining a universal second function corresponding to the target behavior data; and obtaining the category of the user to be identified by analyzing the target behavior data based on the first function and the second function.

\* \* \* \* \*